US 8,572,565 B2

(12) United States Patent
Bozak et al.

(10) Patent No.: US 8,572,565 B2
(45) Date of Patent: Oct. 29, 2013

(54) CENTRAL CONFIGURATION AND TRANSPORT SUPPORTING SOFTWARE LIFECYCLES

(75) Inventors: Erol Bozak, Pforzheim (DE); Wulf Kruempelmann, Altlussheim (DE)

(73) Assignee: SAP AG, Walldorf (DE)

( * ) Notice: Subject to any disclaimer, the term of this patent is extended or adjusted under 35 U.S.C. 154(b) by 667 days.

(21) Appl. No.: 12/627,658

(22) Filed: Nov. 30, 2009

(65) Prior Publication Data
US 2011/0131549 A1    Jun. 2, 2011

(51) Int. Cl.
G06Q 10/00 (2012.01)
G06F 15/177 (2006.01)
G06F 9/44 (2006.01)
G06F 3/00 (2006.01)
G06F 13/00 (2006.01)
G06F 9/46 (2006.01)

(52) U.S. Cl.
USPC .......... 717/121; 705/7.11; 709/221; 717/104; 717/120; 717/122; 719/318

(58) Field of Classification Search
None
See application file for complete search history.

(56) References Cited

U.S. PATENT DOCUMENTS

| 2004/0103393 | A1* | 5/2004 | Reddy et al. ................. 717/122 |
| 2006/0037000 | A1* | 2/2006 | Speeter et al. ................ 717/120 |
| 2006/0242173 | A1* | 10/2006 | Tsyganskiy et al. .......... 707/100 |
| 2006/0242207 | A1* | 10/2006 | Tsyganskiy et al. .......... 707/203 |
| 2006/0282458 | A1* | 12/2006 | Tsyganskiy et al. .......... 707/102 |
| 2006/0293934 | A1* | 12/2006 | Tsyganskiy et al. ............. 705/7 |
| 2006/0293935 | A1* | 12/2006 | Tsyganskiy et al. ............. 705/7 |
| 2008/0215558 | A1* | 9/2008 | Marinelli et al. ............. 709/221 |
| 2008/0270973 | A1* | 10/2008 | Edwards et al. .............. 717/104 |
| 2009/0055838 | A1* | 2/2009 | Sedukhin et al. ............. 719/318 |
| 2010/0114618 | A1* | 5/2010 | Wilcock et al. .................. 705/7 |

OTHER PUBLICATIONS

Waleed A. Muhanna, On the Organization of Large Shared Model Bases, 1992, vol. 38, Issue 1, [Retrieved on Jun. 7, 2013]. Retrieved from the internet: <URL: http://link.springer.com/content/pdf/10.1007%2FBF02283658.pdf> 38 pp. 359-396.*

* cited by examiner

*Primary Examiner* — Don Wong
*Assistant Examiner* — Anibal Rivera
(74) *Attorney, Agent, or Firm* — Fish & Richardson P.C.

(57) ABSTRACT

Implementations of the present disclosure provide computer-implemented methods including retrieving a predefined configuration model from a plurality of predefined configuration models electronically stored in a configuration repository, the predefined configuration model providing predefined configuration data for a particular software application, comparing the predefined configuration data to existing configuration data of one or more target systems to generate a first delta, a first system landscape including the one or more target systems, determining one or more configuration actions based on the first delta, and executing the one or more configuration actions to update a configuration state of the one or more target systems from an initial configuration state.

21 Claims, 6 Drawing Sheets

CENTRAL CONFIGURATION AND TRANSPORT SUPPORTING SOFTWARE LIFECYCLES

BACKGROUND

Typically, software solutions that implement business processes are developed, tested, and released before becoming available for productive use. In order to support the above stages of the software lifecycle, a number of landscape segments may be implemented by a central configuration system. For example, the central configuration system may implement a development landscape segment, where a software solution may be implemented and adapted; a test and quality assurance landscape segment, where the testing of the software solution can take place; and a production landscape segment, on which the software solution can be deployed for productive use.

SUMMARY

Implementations of the present disclosure provide computer-implemented methods including retrieving a predefined configuration model from a plurality of predefined configuration models electronically stored in a configuration repository, the predefined configuration model providing predefined configuration data for a particular software application, comparing the predefined configuration data to existing configuration data of one or more target systems to generate a first delta, a first system landscape including the one or more target systems, determining one or more configuration actions based on the first delta, and executing the one or more configuration actions to update a configuration state of the one or more target systems from an initial configuration state.

In some implementations, the method further includes transporting the configuration state of the first system landscape to a second system landscape, the second system landscape comprising one or more target systems different from the one or more target systems of the first system landscape, comparing the predefined configuration data to transported configuration data to generate a second delta, determining one or more configuration actions based on the second delta, and executing the one or more configuration actions to update a configuration state of the one or more target systems of the second system landscape. In such implementations, the method can further include posting configuration steps to enable productive use of the software application, the first system landscape comprising a testing landscape and the second system landscape comprising a production landscape.

In some implementations, the method further includes executing consistency checks and functional testing of the one or more target systems.

In some implementations, the method further includes determining that execution of a configuration action failed, and executing one or more compensation actions, the compensation actions comprising at least one of reverting the configuration state to the initial configuration state, pausing execution of the configuration actions, and skipping the failed configuration action. In such implementations, the method can further include selecting the one or more compensation actions during execution of the one or more configuration actions.

In some implementations, the configuration data includes technical configuration data including at least one of property value pairs corresponding to settings of a processing engine, user role information, certificates and cross-system configuration data.

In some implementations, the configuration data includes business configuration data including at least one of table and view entries that describe a behavior of a business process.

Implementations of the present disclosure further provide a computer-readable storage medium coupled to one or more processors and having instructions stored thereon which, when executed by the one or more processors, cause the one or more processors to perform operations in accordance with methods provided herein.

Implementations of the present disclosure also provide a system including a configuration repository that electronically stores a plurality of predefined configuration models, and one or more processors in communication with a computer-readable storage medium, the storage medium having instructions stored thereon which, when executed by the one or more processors, cause the one or more processors to perform operations in accordance with methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

As discussed in further detail herein, implementations of the present disclosure are generally directed to the consistent transport of technical and business configuration data along the software lifecycle, which can span one or more system landscapes. Exemplar system landscapes can include, but are not limited to, a development landscape, a test, or quality assurance landscape, and a production landscape. More specifically, implementations of the present disclosure can include a central configuration repository with one or more configuration models stored therein that support technical configuration attached to business processes and solutions, and that processes the configuration data through different lifecycle stages of software.

Figure 1:
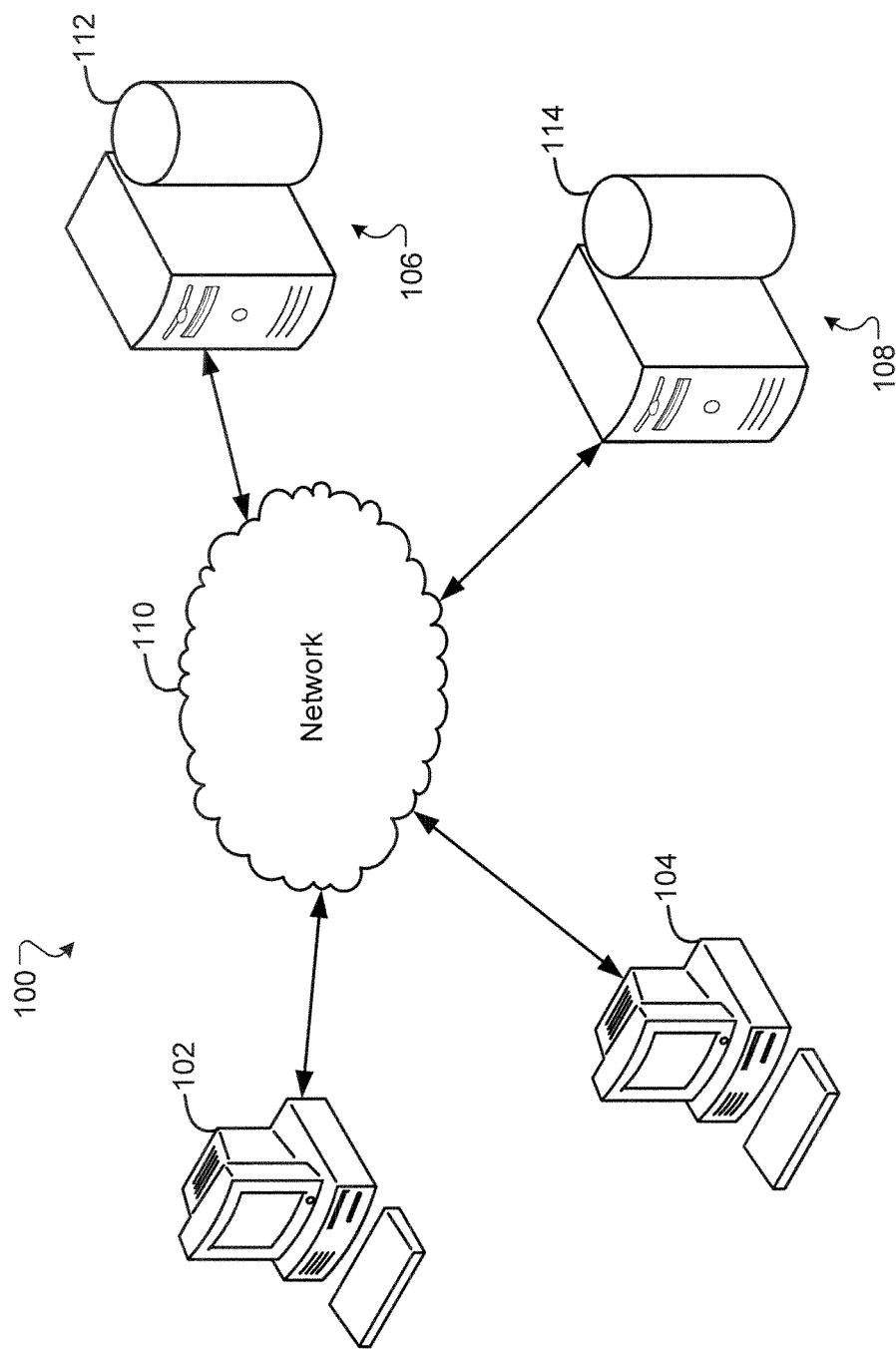
FIG. 1 is a block diagram of an exemplar system architecture that can execute implementations of the present disclosure.

Referring now to FIG. 1, a block diagram of an exemplar system architecture 100 that can be used to execute implementations of the present disclosure is illustrated. The architecture 100 may represent any client/server system that spans one or more networks. In one example, the architecture 100 represents a central configuration management system that can manage the lifecycle of software within a number of systems. For example, the architecture 100 may employ techniques to support technical configuration transport and processing consistently over a number of systems.

In some implementations, the architecture 100 includes a group of computer system landscapes that define a purpose within the software lifecycle. By way of one non-limiting example, a test system landscape can be defined for use in testing the robustness and functionality of software. In this example, the test system landscape can be grouped to form a test environment within the architecture 100. By way of another non-limiting example, a user may define a set of computer systems that are used for a development environment, a production environment, or other networked environment.

System landscapes may be represented by a number of back-end systems (or a logical grouping of a set of systems) that require similar processes, such as mobile clients. System landscapes may define a number of system roles. A system role represents the use of a system-client combination in systems of a logical component. The system role typically describes the usage criteria for a particular system-client combination in a user-specific system. Each role may include a role type that pertains to the function in a specific application system within a landscape. By way of one non-limiting example, a programmer role type may be assigned as a developer function for an application in a development landscape. In general, users may define system roles within each system landscape. In some implementations, system landscapes may include roles that correlate to other roles in other system landscapes In some implementations, the layout of systems within an environment may be represented by a number of system landscapes. The system landscapes provide a hierarchical tree structure of systems within a specified set of systems. In particular, the system landscape can represent a technical representation of one or more groups in a correlation model that can be provided as, but is not limited to, a Common Information Model (CIM). The system landscape is typically the highest node within a system hierarchy.

The architecture 100 can, for example, produce environments that generate new configurations of system landscapes using predefined configurations of system landscapes. In particular, the architecture 100 can generate and assign correlations between system environments (e.g., landscapes) such that the landscapes can be accessible for reuse in other systems. For example, the architecture 100 can generate a selectable list of system landscapes for users (based on correlation data, landscape type, or other input). Each landscape within the list can be employed as a template for creating new system landscapes and/or system landscape types for an environment or system. For example, users can select a system landscape and generate other landscapes based on the selected system landscape.

In some implementations, the architecture 100 may represent a client/server system supporting multiple computer systems including a client 102, a client 104, and/or one or more servers 106 and 108 that are connectively coupled for communication with one another over a network 110. In some implementations, the clients 102, 104 may be directly connected to the servers 106 or 108 (without connecting via network 110).

The clients 102, 104 are intended to represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Each client 102, 104 may access application software on server system 106 and/or server system 108.

The server systems 106, 108 are intended to represent various forms of servers including, but not limited to a web server, an application server, a proxy server, a network server, a server farm, etc. The server system 106 can, for example, be provided as an application server that executes software accessed by client computers 102, 104. The software can include systems such as a solution manager, a transport manager, or a portal, to name a few examples. The server system 108 can, for example, be used to execute the central configuration manager and store the central configuration repository, discussed in further detail with respect to FIG. 2 below.

In operation, multiple clients (e.g., clients 102, 104) can communicate with server system 106 or server system 108 via network 110. In some implementations, a user can invoke applications available from the server system 106 in a web browser running on client 102, 104. Each application can individually access data from a number of repository resources. For example, the server system 106 can access one or more repositories 112 and similarly, the server system 108 can access one or more repositories 114.

In some implementations, the client devices 102, 104 may communicate wirelessly through a communication interface (not shown), which may include digital signal processing circuitry where necessary. The communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver (not shown). In addition, short-range communication may occur, such as using a Bluetooth, WiFi, or other such transceiver.

In some implementations, the architecture 100 can be a distributed client/server system that spans one or more networks such as network 110. The network 110 can be provided as a large computer network, such as a local area network (LAN), wide area network (WAN), the Internet, a cellular network, or a combination thereof connecting any number of mobile clients, fixed clients, and servers. In some implementations, each client (e.g., clients 102, 104) can communicate with the server systems 106, 108 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

Figure 2:
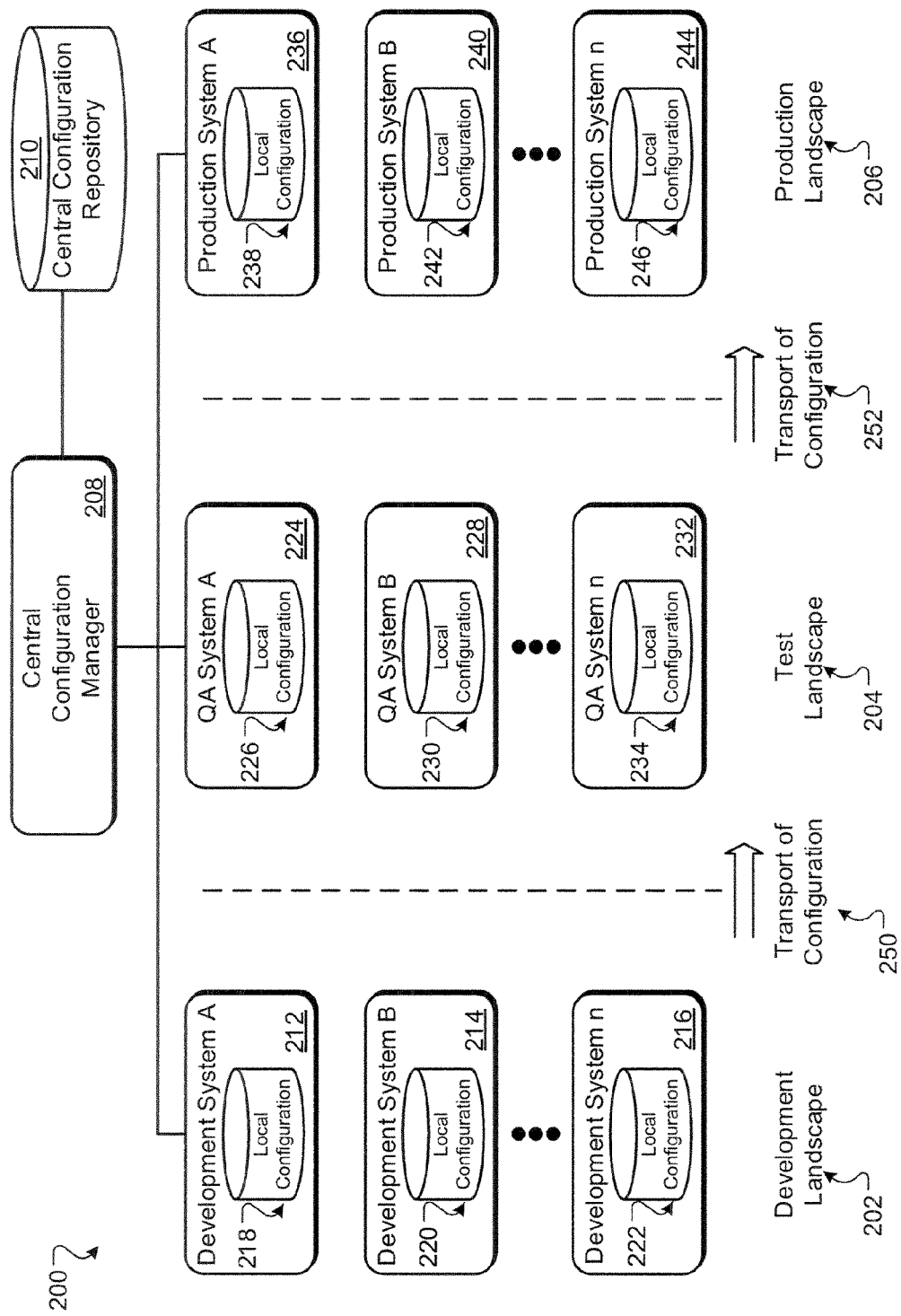
FIG. 2 is a block diagram of a configuration system in accordance with implementations of the present disclosure.

Referring now to FIG. 2, a block diagram depicts a configuration system 200 in accordance with implementations of the present disclosure. The exemplar configuration system 200 can manage, configure, and store any number of system landscapes within a software architecture. Each landscape may include a type identifier that describes the software functionality of the system landscape. Some examples of landscape types may include, but are not limited to, a development landscape type 202, a test landscape type 204, or a production landscape type 206. Although only three landscape types are depicted in FIG. 2, any number of landscape types can be configured in system 200.

The configuration system 200 includes a central configuration manager 208. The central configuration manager 208 is communicably coupled with the development landscape 202, the test landscape 204, and the production landscape 206 to configure, maintain, and/or update the landscapes 202-206. The central configuration manager 208 can perform configurations, maintenance, and updates on system landscapes. The central configuration manager 208 can also determine whether to transport a specific configuration from one landscape into another. For example, the manager 208 can compare predefined configuration data to existing configuration data of one or more target systems to generate a difference, or delta between the configurations. The delta can be used to execute configuration actions that cause an update of a configuration state of the one or more target systems.

The central configuration manager 208 is shown connected to a central configuration repository 210. The central configuration repository 210 maintains all configurations of the software solutions that are deployed in a system. In particular, the central configuration repository 210 maintains a number of system landscape configurations (e.g., in various different versions) depending on the specific type of landscape. In some implementations, the central configuration manager 208 can obtain access to any number of repositories including, but not limited to repository 112 or 114 (FIG. 1). In general, the central configuration repository may store data about which systems exist, transport paths between systems, system roles, technical configurations, business configurations, and other system data.

Exemplar system landscapes 202-206 include a number of systems including system (A) and system (B) to system (n). Each system represents processes executed in an application. The development landscape 202 includes a development system (A) 212, a development system (B) 214, and a development system (n) 216. Each development system 212-216 includes an associated local configuration repository. For example, the development system 212 includes a local configuration repository 218, which contains specific configuration details for the current executing development system (A) 212. The configuration details may include technical details, role details, business object details, predefined configuration data, and other data. Similar to the development system (A) 212, the development system (B) 214 includes a local configuration repository 220 and development system (n) 216 includes a local configuration repository 222.

The test landscape 204 includes a quality assurance (QA) system (A) 224 that contains a local configuration repository 226, a QA system (B) 228 that contains a local configuration repository 230, and a QA system (n) 232 that contains a local configuration repository 234. The production landscape 206 includes a production system (A) 236 that contains a local configuration repository 238; a production system (B) 240 that contains a local configuration repository 242; and a production system (n) 244 that contains a local configuration repository 246.

In general, each landscape 202-206 includes a logical grouping of systems that require similar processes. For example, a user may define a set of systems 202 that are primarily used for development purposes. In a similar fashion, a user may define a set of systems testing purposes, production purposes, accounting purposes, etc.

In operation, the central configuration manager 208 can manage different stages of the lifecycle of a software solution within any or all systems in environment 200. For example, the manager 208 may configure different technical settings of a landscape depending on the state of the landscape. In addition, the manager 208 can ensure that technical configurations are applied consistently across all landscapes. In one example, the central configuration manager 208 can manage target systems in each different landscape where each target system may have different configurations and software release states.

In some implementations, a user can choose to transport configurations from one landscape system to another landscape system. For example, the user can select a configuration state created in the development landscape 202 and transport the configuration into the test landscape 204, as shown by arrow 250. Similarly, the user can select a configuration state modified in the test landscape 204 and transport the modified configuration into the production landscape 206, as shown by arrow 252.

Figure 3:
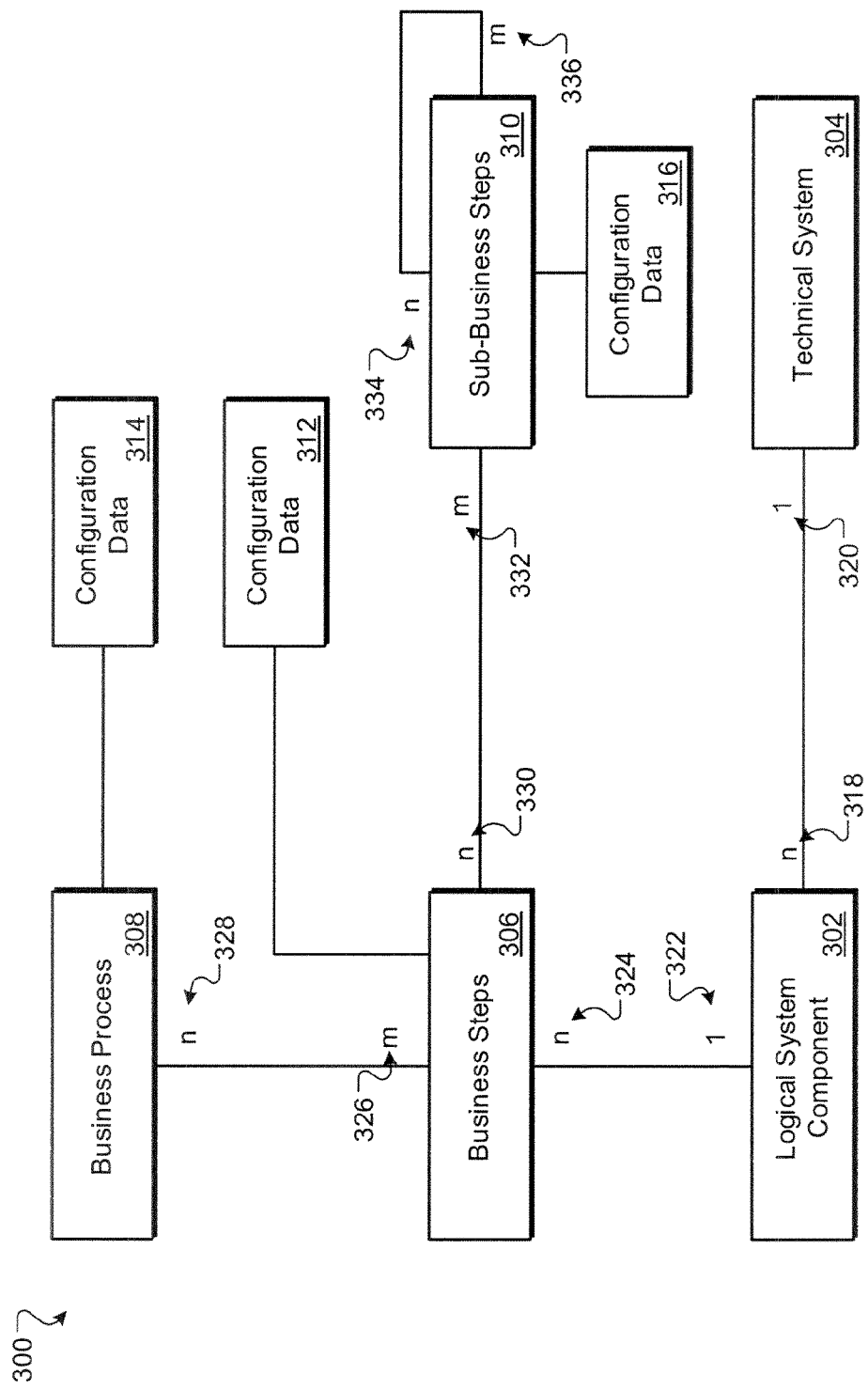
FIG. 3 is a block diagram of exemplar configuration model that assigns business processes in accordance with implementations of the present disclosure.

FIG. 3 provides a block diagram of an exemplar configuration model 300 that assigns business processes in accordance with implementations of the present disclosure. A business process represents a business procedure within a company that uses resources and can involve activities from a number of different cost centers in a controlling area. Business processes may depend on configuration data values that are assigned to the process itself. Example data values may include user data, role data, certificate data, security data, metadata, shipment data, payment data, product data, or other data.

The model 300 may be an example of a predefined landscape configuration model, which can be stored in the central configuration repository 210, a local configuration repository, or other repository. The landscape configuration may include a number of steps and sub-steps. For example, sub-steps for planning the production of a product may include (a) connecting all data which belongs to a product (b) checking availability of materials (c) checking availability of machines to generate product, and (d) checking availability of transport to a customer.

The model 300 includes a logical system component 302 connected to a technical system 304. The logical system component 302 may guide business steps 306 and business processes 308. For example, the logical system component 302 may dictate a transport path for specific steps and processes. In some implementations, business processes 308 may run within business steps 306 that may run on the logical system component 302. The logical system component 302 may be connected to the technical system 304 to perform the business steps 306 and the business processes 308. Each business step 306 may be assigned configuration data 312. Similarly, each business process may be assigned configuration data 314.

In one example, configuration data values can be assigned to business steps 306 and business processes 308 by the example process shown in model 300. The example process may be divided into one or more sub-business steps 310. Each sub-business step 310 may be assigned configuration data 316. The configuration data 316 may specify which supplies, resources, and/or personnel to implement for use in a specific process or step.

Configuration data 312, 314, and 316 may be divided into a particular configuration data type. For example, configuration data 312, 314, or 316 may represent technical configuration data and/or business configuration data. Technical configuration data can, for example, include property value pairs corresponding to configurations settings of a processing engine (e.g., required user role information, technical system user, or certificates), user role information, certificates, and cross system configuration data (e.g., destinations to other systems, exchange certificates, or trusting connections between the system). The configuration settings can be imported into a system by a process which configures lowlevel settings in a user interface. In some implementations, configuring settings may be automated and controlled by a system procedure.

Business configuration data can include complex table and view entries that describe the behavior of business processes within a system. Business configuration data may be used to configure business processes and system roles. For example, business configuration data may be used to differentiate which targeted or authorized destinations are selected for performing specific processes. Business configuration data may also be used to configure system roles. For example, settings may be set or modified depending on which system role is performing a particular task.

The model 300 can include cardinality rules between steps. The cardinality rules may define the numeric relationship between occurrences of entities happening in the systems, steps, or processes within FIG. 3. As an example, the logical system component 302 includes (n) occurrences 318, while the technical system includes (1) occurrence 320 for each occurrence of the logical system component 302. This example of cardinality conveys that the logical system component 302 belongs to more than one technical system (e.g., n technical systems), but only one technical system 304 occurrence is used for a particular role. In another example, the logical system component 302 includes (1) occurrence 322, while the business steps 306 include (n) occurrences 324. This example of cardinality conveys that each business step 306 is implemented in one particular logical system component, but a logical system component could host multiple (n) business steps. Similarly, business processes 308 may include a number of business step occurrences (m) 326 and business steps 306 may include a number of business process occurrences (n) 328. In yet another example, sub-business steps 310 may include a number of business step occurrences (n) 330, while business steps 306 may include a number of sub-business step occurrences (m) 332.

In some implementations, certain entities include a cardinality value within itself. For example, the sub-business steps 310 may include any number of occurrences (n) 334 with another sub-business step 310 having occurrences (m) 336.

Figure 4:
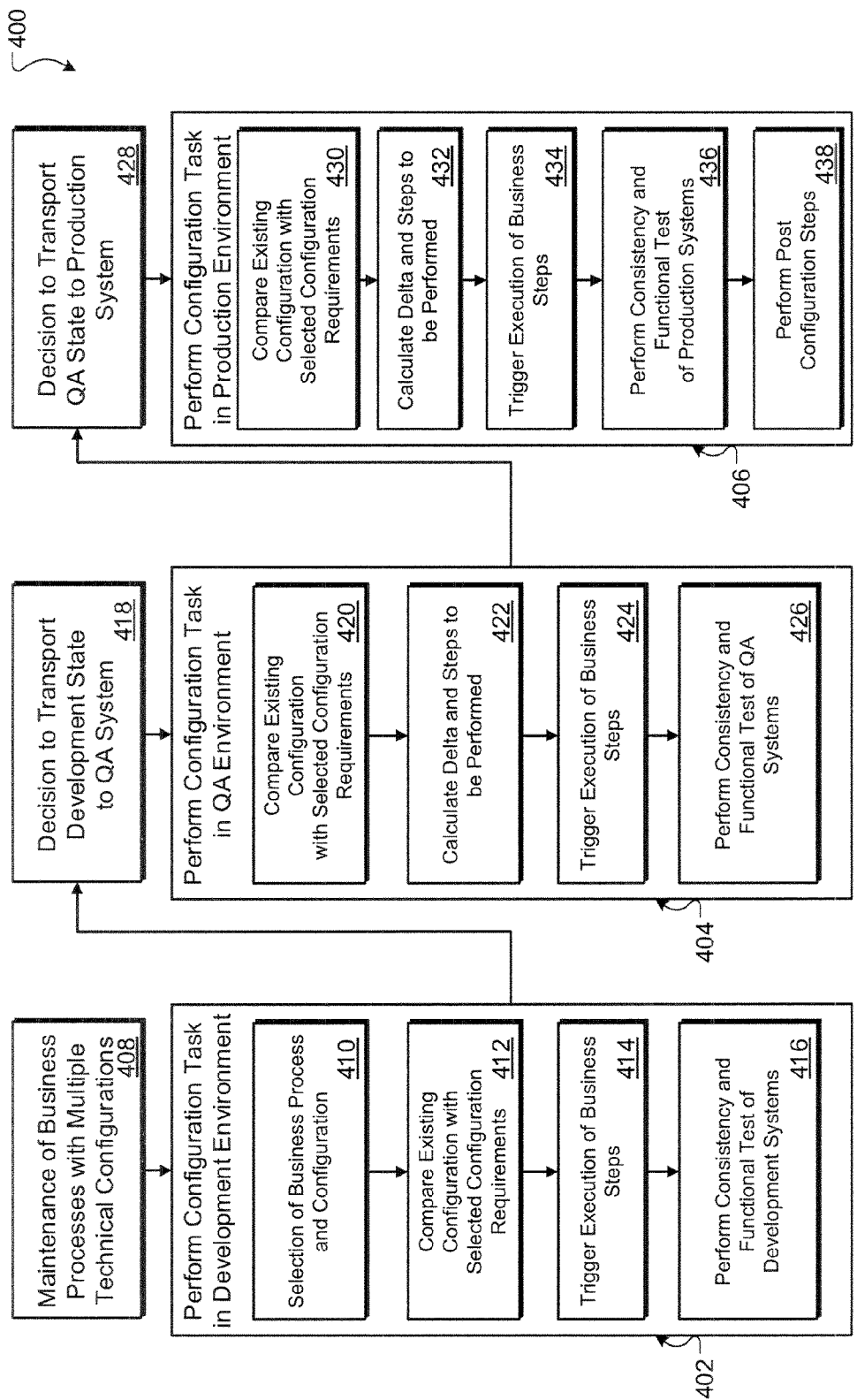
FIG. 4 is a flow-diagram illustrating exemplar steps that can be executed to perform configuration tasks in accordance with implementations of the present disclosure.

Referring now to FIG. 4, a flow-diagram illustrates an exemplar process 400 that can be executed to perform configuration tasks in accordance with implementations of the present disclosure. The process 400 can perform tasks in any or all of a development environment 402, a QA environment 404, or a production environment 406. In general, the process 400 can maintain business processes with multiple technical configurations 408 and determine whether to transport a development status to another system landscape (e.g., environment). In some implementations, the steps below can be performed in system 200, for example, to synchronize configuration states between one or more systems utilizing system data.

In the development environment, the process 400 can select one or more business processes and software solutions, in step 410. For example, the central configuration manager 208 selects a business process and a configuration for a particular set of target systems. The business processes and solutions may include configuration information that is maintained in the central configuration repository 210. In general, a business process may have one or more configurations depending on the particular use case or scenario. For example, productive systems and test systems may have different availability settings.

The existing configuration is compared to selected (e.g., user desired) configuration requirements, in step 412. For example, the central configuration manager can 208 compare the configuration of a selected business process with the existing configuration of the target systems in the particular landscape segment. In this example, the central configuration manager 208 performs the comparison in the development environment 402. The comparison can be performed to calculate the steps required to upload the new configuration into a particular system. As such, any number of procedures can be used to calculate discrepancies between a current stored configuration state and a desired configuration state. Execution of business steps and/or sub-business steps is triggered in step 414. For example, the central configuration manager 208 invokes one or more application programming interfaces (APIs) of the particular target system and issues a request to set a particular configuration.

In some implementations, other actions can be invoked if, for example, execution of one or more steps fails. For example, the central configuration manager 208 may perform compensating actions when executions of the steps fail. The compensating actions may include rolling back a configuration state to an initial configuration state, pausing the execution and allowing a user to resolve failures manually, or skipping the failed steps. These compensating actions (e.g., policies) may be chosen by the user either during the execution of the steps or prior to the execution of any steps. Other actions are also possible.

Consistency checks and functional tests are performed for one or more target systems (e.g., development systems 212-216) in step 416. For example, once the execution is finalized, the central configuration manager 208 runs a test of the configuration state of the target system. The tests are typically performed to verify that a particular configuration can function in the intended system. If the tests succeed, the user can transport the tested configuration to another target system.

Before transporting the configuration, the user can decide whether to perform the transport of the tested configuration. Collaborative processes to ensure that regulatory policies are adhered to may be used to support a user with this decision. For example, the central configuration manager 208 can provide the user with information about company policies that require confirmation of a transport based on system policies. Once the user determines that a transport can be performed, in step 418, the transport can be executed. Execution of the transport induces the target systems in the target environment to update to a desired configuration state.

At this point, the configuration state of the development environment 402 has been transported into the QA environment 404. In step 420, the existing configuration at the managed system (e.g., system 404) is compared the selected configuration requirements. In this case, the existing configuration is that configuration transported from the development environment 402. In step 422, a delta is determined and any necessary configuration steps to bring the target system to the desired configuration state are determined based on the delta. In step 424, business steps necessary to execute a particular configuration are triggered. In step 426, consistency checks and functional tests of the QA system 404 are performed. In step 428, the user can determine whether a transport of the QA state to the production system can be performed. Execution of the transport induces the target systems in the target environment to update to a desired configuration state.

At this point, the configuration state of the QA environment 404 has been transported into the production environment 406. In step 430, the existing configuration at the managed system (e.g., system 406) is compared to the selected configuration requirements. In this case, the existing configuration is that configuration transported from the QA environment 404. In step 432, a delta of the configuration is calculated and any necessary configuration steps to be performed to bring the target system to the desired configuration state are determined based on the delta. In step 434, execution of business steps necessary to execute a particular configuration are triggered. In step 436, consistency tests and functional tests of the production system are performed.

The overall process 400 ends in the production landscape segment 406 where final post configuration steps are performed in step 438. These post steps include configuration aspects that enable a system to run in a productive mode. The steps can include, but are not limited to, setting up a monitoring infrastructure, setting a high-availability configuration, and load-balancing.

Figure 5:
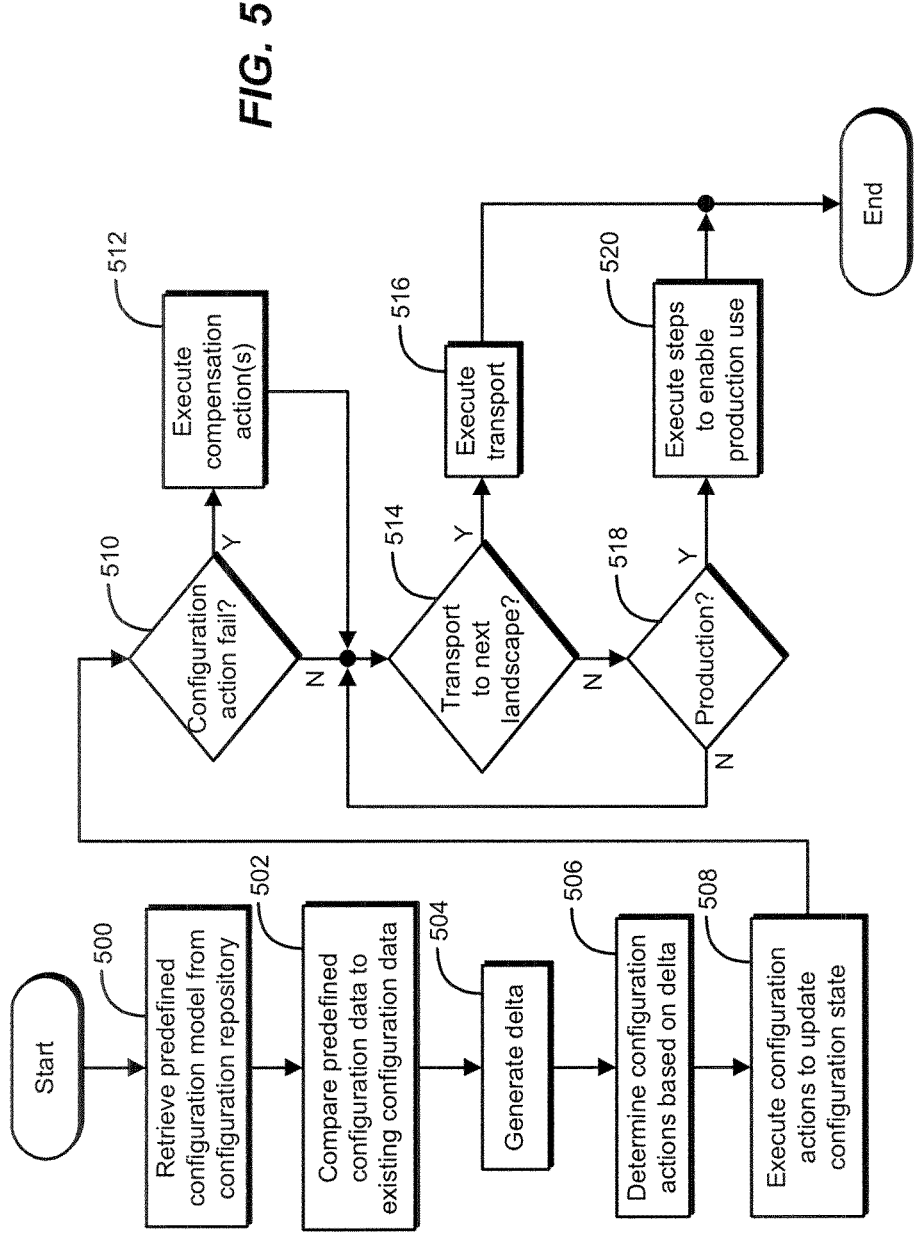
FIG. 5 is a flowchart illustrating exemplar steps that can be executed to update a configuration state of a system in accordance with implementations of the present disclosure.

FIG. 5 is a flowchart illustrating exemplar steps that can be executed to update a configuration state of a system in accordance with implementations of the present disclosure. In particular, the steps can be executed to update the configuration for one or more target systems. The process shown in FIG. 5 may be implemented using software instructions stored in a computer-readable storage medium and executed by a processing system including one or more processors. The process can, for example, be performed in the environment 100, the clients 102 or 104, and/or servers 106 or 108, or the central configuration manager 208.

In step 500, the process retrieves one or more predefined configuration models from a configuration repository. For example, the configuration manager 208 retrieves a predefined configuration model from a number of predefined configuration models electronically stored in the central configuration repository 210. The retrieved predefined configuration model provides predefined configuration data for a particular software application. In step 502, the predefined configuration data is compared to existing configuration data. For example, the retrieved, predefined configuration data is compared to existing configuration data of one or more target systems. In step 504, a delta is generated based on the comparison between the predefined configuration data and the existing configuration data of the target system. The target system may include a first system landscape such as a testing landscape.

In step 506, one or more configuration actions are determined based on the delta. For example, the central configuration manager determines configuration actions such that can be used to update a current configuration to a desired configuration. In step 508, configuration actions are executed to update a configuration state. For example, configuration actions are executed to update the configuration state of one or more target systems from an initial configuration state. In step 510, it is determined whether the executed configuration actions have failed. If one or more configuration actions has failed, one or more compensation actions are selected and executed in step 512. The compensation actions may include, but are not limited to, reverting the configuration state to an initial configuration state, pausing execution of the configuration actions, and/or skipping the failed configuration action. In one example, the execution actions are selected during the execution of the one or more configuration actions.

If none of the performed configuration actions fail, it is determined whether to transport the configuration to another landscape in step 514. If it is determined to transport the configuration to another system landscape, the transport is executed in step 516. The next landscape (e.g., QA landscape 404, production landscape 406) may include one or more target systems different form the target systems in the originating system landscape. If the process determines not to transport the configuration to the another landscape, it is determined whether the system is ready for production use in step 518. If it is determined not to transport to production, the process loops back to step 514. If it is determined to transport to production, steps to enable production use are executed in step 520.

Figure 6:
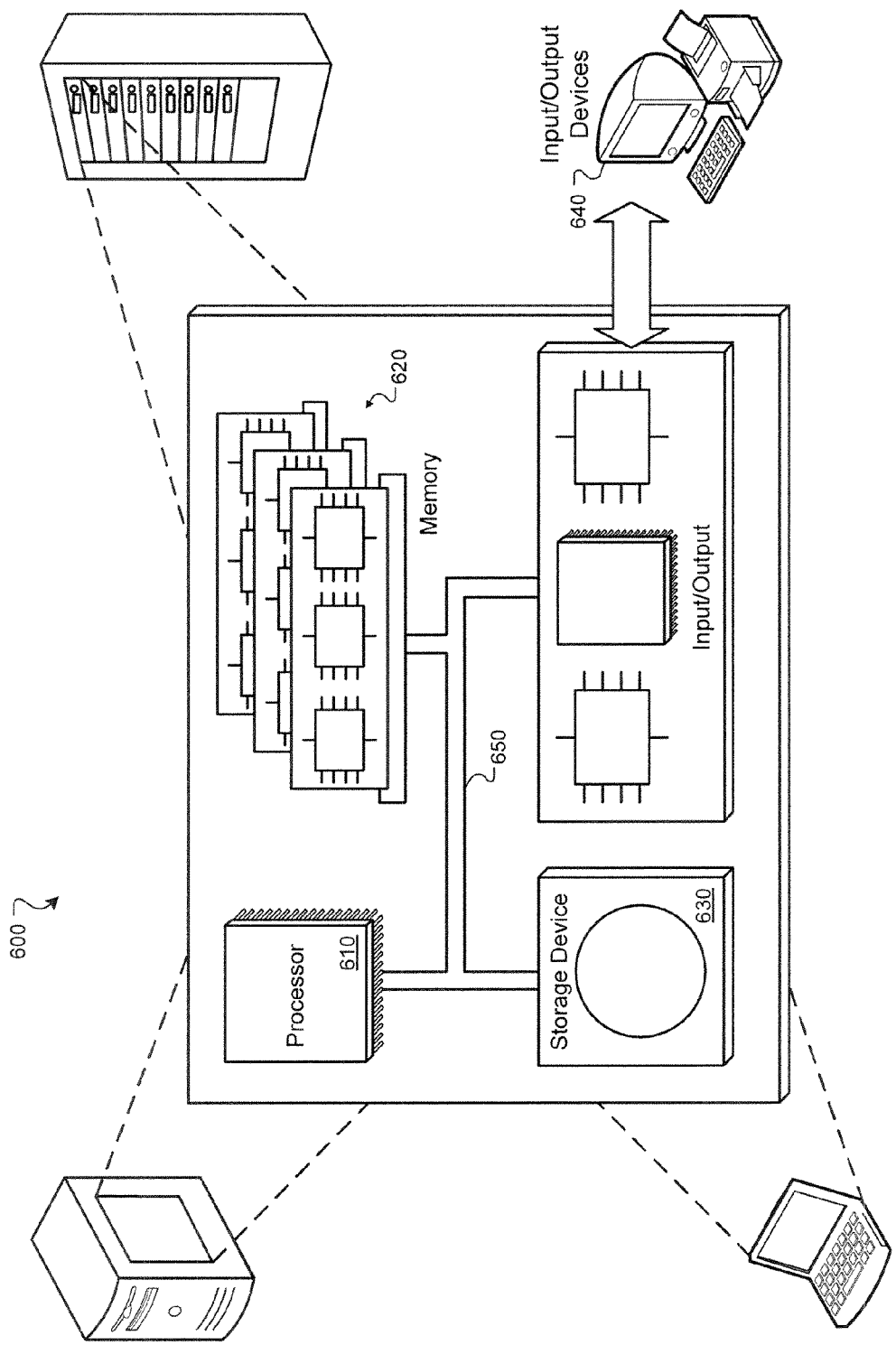
FIG. 6 is a schematic illustration of exemplar computer systems that can be used to execute implementations of the present disclosure.

Referring now to FIG. 6, a schematic diagram of an exemplar computer system 600 is provided. The system 600 can be used for the operations described in association with the method described in FIGS. 4 and 5 according to one implementation. For example, the system 600 may be included in any or all of the client 102, the client 104, the server 106, the server 108, the central configuration manager 208, or systems 302 or 304 described in FIG. 3. The system 600 includes a processor 610, a memory 620, a storage device 630, and an input/output device 640. Each of the components 610, 620, 630, and 640 are interconnected using a system bus 680. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for transporting configurations between system landscapes, the method comprising:

retrieving a predefined configuration model from a plurality of predefined configuration models electronically stored in a configuration repository, the predefined configuration model providing predefined configuration data for a particular software application, the predefined configuration data defining a desired configuration state, and the predefined configuration model comprising a logical system component that is associated with one or more other components, each of the one or more other components being associated with configuration data of the predefined configuration data; and determining that an existing configuration state of a first system landscape is to be updated to the desired configuration state, and in response:

retrieving existing configuration data associated with one or more target systems of the first system landscape, the existing configuration data defining the existing configuration state;

comparing the predefined configuration data to the existing configuration data to generate a first delta;

determining one or more configuration actions based on the first delta; and executing the one or more configuration actions to update the existing configuration state to the desired configuration state.

2. The method of claim 1, further comprising:

transporting the configuration state of the first system landscape to a second system landscape, the second system landscape comprising one or more target systems different from the one or more target systems of the first system landscape;

comparing the predefined configuration data to transported configuration data to generate a second delta;

determining one or more configuration actions based on the second delta; and executing the one or more configuration actions to update an existing configuration state of the one or more target systems of the second system landscape.

3. The method of claim 2, further comprising posting configuration steps to enable productive use of the software application, the first system landscape comprising a testing landscape and the second system landscape comprising a production landscape.

4. The method of claim 1, further comprising executing consistency checks and functional testing of the one or more target systems.

5. The method of claim 1, further comprising:

determining that execution of a configuration action failed; and executing one or more compensation actions, the compensation actions comprising at least one of reverting the configuration state to the existing configuration state, pausing execution of the configuration actions, and skipping the failed configuration action.

6. The method of claim 5, further comprising selecting the one or more compensation actions during execution of the one or more configuration actions.

7. The method of claim 1, wherein the configuration data includes at least one of technical configuration data comprising at least one of property value pairs corresponding to settings of a processing engine, user role information, certificates and cross-system configuration data, and business configuration data comprising at least one of table and view entries that describe a behavior of a business process.

8. A computer-readable storage medium coupled to one or more processors and having instructions stored thereon which, when executed by the one or more processors, cause the one or more processors to perform operations for transporting configurations between system landscapes, the operations comprising:

retrieving a predefined configuration model from a plurality of predefined configuration models electronically stored in a configuration repository, the predefined configuration model providing predefined configuration data for a particular software application, the predefined configuration data defining a desired configuration state, and the predefined configuration model comprising a logical system component that is associated with one or more other components, each of the one or more other components being associated with configuration data of the predefined configuration data; and determining that an existing configuration state of a first system landscape is to be updated to the desired configuration state, and in response:

retrieving existing configuration data associated with one or more target systems of the first system landscape, the existing configuration data defining the existing configuration state;

comparing the predefined configuration data to the existing configuration data to generate a first delta;

determining one or more configuration actions based on the first delta; and executing the one or more configuration actions to update the existing configuration state to the desired configuration state.

9. The computer-readable storage medium of claim 8, wherein the operations further comprise:

transporting the configuration state of the first system landscape to a second system landscape, the second system landscape comprising one or more target systems different from the one or more target systems of the first system landscape;

comparing the predefined configuration data to transported configuration data to generate a second delta;

determining one or more configuration actions based on the second delta; and executing the one or more configuration actions to update an existing configuration state of the one or more target systems of the second system landscape.

10. The computer-readable storage medium of claim 9, wherein the operations further comprise posting configuration steps to enable productive use of the software application, the first system landscape comprising a testing landscape and the second system landscape comprising a production landscape.

11. The computer-readable storage medium of claim 8, wherein the operations further comprise executing consistency checks and functional testing of the one or more target systems.

12. The computer-readable storage medium of claim 8, wherein the operations further comprise:

determining that execution of a configuration action failed; and executing one or more compensation actions, the compensation actions comprising at least one of reverting the configuration state to the initial existing configuration state, pausing execution of the configuration actions, and skipping the failed configuration action.

13. The computer-readable storage medium of claim 12, wherein the operations further comprise selecting the one or more compensation actions during execution of the one or more configuration actions.

14. The computer-readable storage medium of claim 8, wherein the configuration data includes at least one of technical configuration data comprising at least one of property value pairs corresponding to settings of a processing engine, user role information, certificates and cross-system configuration data, and business configuration data comprising at least one of table and view entries that describe a behavior of a business process.

15. A system, comprising:

a configuration repository that electronically stores a plurality of predefined configuration models; and one or more processors in communication with a computer-readable storage medium, the storage medium having instructions stored thereon which, when executed by the one or more processors, cause the one or more processors to perform operations for transporting configurations between system landscapes, the operations comprising:

retrieving a predefined configuration model from the plurality of predefined configuration models electronically stored in the configuration repository, the predefined configuration model providing predefined configuration data for a particular software application, the predefined configuration data defining a desired configuration state, and the predefined configuration model comprising a logical system component that is associated with one or more other components, each of the one or more other components being associated with configuration data of the predefined configuration data; and determining that an existing configuration state of a first system landscape is to be updated to the desired configuration state, and in response:

retrieving existing configuration data associated with one or more target systems of the first system landscape, the existing configuration data defining the existing configuration state;

the predefined configuration model comprising a logical system component that is associated with one or more other components, each of the one or more other components being associated with configuration data of the predefined configuration data;

comparing the predefined configuration data to the existing configuration data to generate a first delta;

determining one or more configuration actions based on the first delta; and executing the one or more configuration actions to update the existing configuration state to the desired configuration state.

16. The system of claim 15, wherein the operations further comprise:

transporting the configuration state of the first system landscape to a second system landscape, the second system landscape comprising one or more target systems different from the one or more target systems of the first system landscape;

comparing the predefined configuration data to transported configuration data to generate a second delta;

determining one or more configuration actions based on the second delta; and executing the one or more configuration actions to update an existing configuration state of the one or more target systems of the second system landscape.

17. The system of claim 16, wherein the operations further comprise posting configuration steps to enable productive use of the software application, the first system landscape comprising a testing landscape and the second system landscape comprising a production landscape.

18. The system of claim 15, wherein the operations further comprise executing consistency checks and functional testing of the one or more target systems.

19. The system of claim 15, wherein the operations further comprise:

determining that execution of a configuration action failed; and executing one or more compensation actions, the compensation actions comprising at least one of reverting the configuration state to the initial existing configuration state, pausing execution of the configuration actions, and skipping the failed configuration action.

20. The system of claim 19, wherein the operations further comprise selecting the one or more compensation actions during execution of the one or more configuration actions.

21. The system of claim 15, wherein the configuration data includes at least one of technical configuration data comprising at least one of property value pairs corresponding to settings of a processing engine, user role information, certificates and cross-system configuration data, and business configuration data comprising at least one of table and view entries that describe a behavior of a business process.

* * * * *